(12) United States Patent
Foreman (10) Patent No.: US 9,203,833 B2
(45) Date of Patent: Dec. 1, 2015

(54) USER AUTHORIZATION USING AN AUTOMATED TURING TEST

(75) Inventor: Paul E. Foreman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1113 days.

(21) Appl. No.: 11/950,872

(22) Filed: Dec. 5, 2007

(65) Prior Publication Data

US 2009/0150986 A1 Jun. 11, 2009

(51) Int. Cl.
  H04L 29/06 (2006.01)
  H04L 9/32 (2006.01)
  G06F 21/36 (2013.01)

(52) U.S. Cl.
  CPC .............. *H04L 63/083* (2013.01); *G06F 21/36* (2013.01); *H04L 9/3226* (2013.01)

(58) Field of Classification Search
  CPC ...... G06F 21/36; H04L 63/083; H04L 9/3226
  USPC ............ 713/182, 183; 726/4, 5, 6, 17, 18, 21, 726/28
  See application file for complete search history.

(56) References Cited

U.S. PATENT DOCUMENTS

| | | | |
|---|---|---|---|
| 3,873,769 A | 3/1975 | Cotter | |
| 4,393,410 A | 7/1983 | Ridge et al. | |
| 4,577,058 A | 3/1986 | Collins | |
| 4,771,336 A | 9/1988 | Ohtorii | |
| 5,574,577 A | 11/1996 | Wally, Jr. et al. | |
| 5,630,168 A | 5/1997 | Rosebrugh et al. | |
| 5,838,326 A | 11/1998 | Card et al. | |
| 6,014,662 A | 1/2000 | Moran et al. | |
| 6,561,678 B2 | 5/2003 | Loughrey | |
| 6,571,279 B1 | 5/2003 | Herz et al. | |
| 6,581,104 B1 * | 6/2003 | Bereiter | 709/232 |
| 6,636,831 B1 | 10/2003 | Profit, Jr. et al. | |

(Continued)

FOREIGN PATENT DOCUMENTS

| | | |
|---|---|---|
| EP | 0450196 A1 | 4/1990 |
| EP | 0543566 A2 | 11/1992 |

(Continued)

OTHER PUBLICATIONS

Athanasopoulos, Elias; Antonatos, Spiros, "Enhanced CAPTCHAs: Using Animation to Tell Humans and Computers Apart", IFIP 2006, pp. 97-108.*

(Continued)

*Primary Examiner* — Victor Lesniewski
(74) *Attorney, Agent, or Firm* — DeLizio Law, PLLC (57) ABSTRACT

Methods, apparatus, and products are disclosed for user authorization using an automated Turing Test that include: selecting, by an automated Turing Test module, a challenge token, the challenge token including a challenge key; repeatedly at an Automated Turing Test pace: selecting, by the Automated Turing Test module, a portion of the challenge token in dependence upon predetermined selection criteria, and revealing, by Automated Turing Test module, only the selected portion of the challenge token to a user; receiving, by the Automated Turing Test module from the user, a user response; determining, by the Automated Turing Test module, whether the user response matches the challenge key; and authorizing, by the Automated Turing Test module, the user to access a resource if the user response matches the challenge key.

15 Claims, 6 Drawing Sheets

(56) References Cited

U.S. PATENT DOCUMENTS

| | | | |
|---|---|---|---|
| 6,806,636 B2 | 10/2004 | Kang et al. | |
| 6,839,669 B1 | 1/2005 | Gould et al. | |
| 6,850,252 B1 | 2/2005 | Hoffberg | |
| 6,970,821 B1 | 11/2005 | Shambaugh et al. | |
| 6,982,649 B2 | 1/2006 | Blum et al. | |
| 6,999,932 B1 | 2/2006 | Zhou | |
| 7,035,804 B2 | 4/2006 | Saindon et al. | |
| 7,174,056 B2 | 2/2007 | Silverbrook et al. | |
| 7,209,124 B2 | 4/2007 | Hunt et al. | |
| 7,830,408 B2 | 11/2010 | Asthana et al. | |
| 2002/0191072 A1 | 12/2002 | Henrikson | |
| 2003/0066073 A1 | 4/2003 | Rebh | |
| 2003/0160862 A1 | 8/2003 | Charlier et al. | |
| 2004/0019482 A1 | 1/2004 | Holub | |
| 2004/0051644 A1 | 3/2004 | Tamayama et al. | |
| 2004/0199597 A1 | 10/2004 | Libbey et al. | |
| 2004/0201871 A1 | 10/2004 | Risheq | |
| 2004/0237033 A1 | 11/2004 | Woolf et al. | |
| 2005/0110964 A1 | 5/2005 | Bell et al. | |
| 2005/0149364 A1 | 7/2005 | Ombrellaro | |
| 2005/0154595 A1 | 7/2005 | Bodin | |
| 2005/0182680 A1 | 8/2005 | Jones et al. | |
| 2005/0183023 A1 | 8/2005 | Maruyama et al. | |
| 2006/0001650 A1 | 1/2006 | Robbins et al. | |
| 2006/0036944 A1 | 2/2006 | Wilson | |
| 2006/0073891 A1 | 4/2006 | Holt | |
| 2006/0117669 A1 | 6/2006 | Baloga et al. | |
| 2006/0126128 A1 | 6/2006 | Ahmed et al. | |
| 2006/0132501 A1 | 6/2006 | Nonaka et al. | |
| 2006/0146034 A1 | 7/2006 | Chen et al. | |
| 2006/0176524 A1 | 8/2006 | Willrich | |
| 2006/0203208 A1 | 9/2006 | Thielman et al. | |
| 2006/0204030 A1 | 9/2006 | Kogure et al. | |
| 2006/0267966 A1 | 11/2006 | Grossman et al. | |
| 2006/0287963 A1 | 12/2006 | Steeves et al. | |
| 2007/0005500 A1 | 1/2007 | Steeves et al. | |
| 2007/0026372 A1* | 2/2007 | Huelsbergen | 434/322 |
| 2007/0055929 A1 | 3/2007 | Giannetti et al. | |
| 2007/0083666 A1 | 4/2007 | Apelbaum | |
| 2007/0130618 A1* | 6/2007 | Chen | 726/8 |
| 2007/0143103 A1 | 6/2007 | Asthana et al. | |
| 2007/0143624 A1* | 6/2007 | Steeves | 713/182 |
| 2007/0143690 A1 | 6/2007 | Nakajima et al. | |
| 2007/0156811 A1 | 7/2007 | Jain et al. | |
| 2007/0201745 A1* | 8/2007 | Wang et al. | 382/181 |
| 2007/0220444 A1 | 9/2007 | Sunday et al. | |
| 2007/0277224 A1* | 11/2007 | Osborn et al. | 726/2 |
| 2008/0028321 A1 | 1/2008 | Weksler et al. | |
| 2008/0066014 A1* | 3/2008 | Misra | 715/846 |
| 2008/0088593 A1 | 4/2008 | Smoot | |
| 2008/0122803 A1 | 5/2008 | Izadi et al. | |
| 2008/0127302 A1* | 5/2008 | Qvarfordt et al. | 726/2 |
| 2008/0168403 A1 | 7/2008 | Westerman et al. | |
| 2008/0192059 A1 | 8/2008 | Kennedy | |
| 2008/0270230 A1 | 10/2008 | Hendrickson et al. | |
| 2009/0002327 A1 | 1/2009 | Wilson et al. | |
| 2009/0113294 A1* | 4/2009 | Sanghavi et al. | 715/269 |
| 2009/0138723 A1* | 5/2009 | Nyang et al. | 713/182 |
| 2009/0150983 A1* | 6/2009 | Saxena et al. | 726/7 |
| 2009/0328163 A1* | 12/2009 | Preece | 726/5 |
| 2010/0031315 A1* | 2/2010 | Feng et al. | 726/3 |

FOREIGN PATENT DOCUMENTS

| | | | |
|---|---|---|---|
| EP | 1 315 071 A | 5/2003 | |
| EP | 1 621 989 A2 | 2/2006 | |
| JP | 2000 148396 A | 5/2000 | |
| WO | WO 01/01391 A1 | 1/2001 | |
| WO | WO 03/036415 A2 | 5/2003 | |

OTHER PUBLICATIONS

Dailey, Matthew; Namprempre, Chanathip; "A Text-Graphics Character CAPTCHA for Password Authentication", IEEE Region 10 Conference (TENCON), Nov. 21-24, 2004, IEEE, vol. 2, pp. 45-48.*
Wang, Sui-Yu; Baird, Henry S.; Bentley, Jon L.; "CAPTCHA Challenge Tradeoffs: Familiarity of Strings versus Degradation of Images", 18$^{th}$ International Conference on Pattern Recognition, 2006, IEEE, pp. 164-167.*
PCT Search Report; Dec. 29, 2008; PCT Application No. PCT/EP2008/063007.
Bohte, et al.; "Market-Based Recommendation: Agents that Compete for Consumer Attention"; Nov. 2004; pp. 420-448; vol. 4, No. 4; ACM Transactions on Internet Technology; Broadway, New York.
Lemon, et al.; "Multithreaded Context for Robust Conversational Interfaces: Context-Sensitive Speech Recognition and Interpretation of Corrective Fragments"; Sep. 2004; pp. 241-267; vol. 11, No. 3; ACM Transactions on Computer-Human Interaction; Broadway, New York.
Gabriel, et al.; "Conscientious Software"; Oct. 2006; pp. 433-450; ACM 1-59593-348-4/06/0010; Sun Microsystems, Inc.; Portland, Oregon.
McTear; "Spoken Dialogue Technology: Enabling the Conversational User Interface"; Mar. 2002; pp. 90-169; vol. 34, No. 1; ACM Computing Surveys.
Bollacker, et al.; "A System for Automatic Personalized Tracking of Scientific Literature on the Web"; NEC Research Institute; pp. 105-113; Princeton, NJ.
Jagadish, et al.; "Making Database Systems Usable"; SIGMOD'07; Jun. 12-14, 2007; pp. 13-24; ACM 978-1-59593-686-8/07/0006; Beijing, China.
Marshall, et al.; Exploring the Relationship Between Personal and Public Annotations; JCDL'04; Jun. 7-11, 2004; pp. 349-357; ACM 1-58113-832-6/4/0006; Tucson, Arizona.
Ashdown, et al.; "Escritoire: A Personal Projected Display"; IEEE Multimedia, vol. 12, Issue 1; Jan.-Mar. 2005; pp. 34-42.
Athanasopoulos, et al.; Enhanced CAPTCHAs: Using Animation to Tell Humans and Computers Apart; 2006; pp. 97-108; CMS 2006-LNCS 4237; IFIP.
PCT Search Report and Written Opinion, Feb. 5, 2009; PCT Application No. PCT/EP2008/063006.
Microsoft: "Microsoft Launches New Product Category: Surface Computing Comes to Life in Restaurants, Hotels, Retail Locations and Casino Resorts" Microsoft Website, [Online] May 29, 2007, p. 13, XP00251268, Carlsbad, California, US.
Office Action, U.S. Appl. No. 11/869,313, Aug. 5, 2010.
Office Action, U.S. Appl. No. 11/868,766, Aug. 6, 2010.
Office Action, U.S. Appl. No. 11/868,513, Aug. 6, 2010.
Office Action, U.S. Appl. No. 11/869,313, Jan. 28, 2011.
Fetzer, C., Kaefer, K., Augsten, T., Meusel, R., Kanitz, D., Stoff, T., Becker, T., Holt, C. and Baudisch, P. Multitoe: High-Precision Interation with Back-Projected Floors Based on High-Resolution Multi-Touch Input to appear in Proceedings of UIST 2010, New York, NY, Oct. 3-6, 2010, 10 pages.
Final Office Action, U.S. Appl. No. 11/869,313, Dec. 10, 2010.
Office Action, U.S. Appl. No. 11/868,513, Dec. 10, 2010.
Office Action, U.S. Appl. No. 11/869,987, Nov. 30, 2010.
Final Office Action, U.S. Appl. No. 11,868,766, Dec. 9, 2010.
Office Action, U.S. Appl. No. 11/868,474, Oct. 29, 2010.
Office Action, U.S. Appl. No. 11/868,216, Aug. 20, 2010.
Office Action, U.S. Appl. No. 11/950,872, Oct. 15, 2010.

* cited by examiner

USER AUTHORIZATION USING AN AUTOMATED TURING TEST

BACKGROUND OF THE INVENTION

1. Field of the Invention

The field of the invention is data processing, or, more specifically, methods, apparatus, and products for user authorization using a Completely Automated Public Turing test to tell Computers and Humans Apart ('Automated Turing Test').

2. Description of Related Art

A Completely Automated Public Turing test to tell Computers and Humans Apart ('Automated Turing Test') is a rather simple test that can be easily answered by a human but extremely difficult to be answered by a computer. Automated Turing Tests have been widely used for practical security reasons, such as for example, preventing automated registration in web-based services like web-based email. Email providers may use an automated Turing Test as a step in the registration process to prevent automated scripts from subscribing and using their resources for spam distribution. Other applications of Automated Turing Tests involve on-line polls, web-blogs, or purchasing products, where only humans are permitted participate.

An automated Turing Test typically presents a human with a token that includes a key. The token is often implemented as an image and the key is often implemented as text within the image. While a human is generally able to identify the text within the image fairly easily, such identification is often difficult for a computer program. Automated Turing Tests typically attempt to frustrate a computer programs ability to identify the key by embedding text into the image that violates OCR recognition rules. As computer programs have become more advanced, however, a program's ability to recognize the key text is becoming more advanced—often allowing such programs to identify the key and foil the Automated Turing Test. To combat the advancement of computer programs attempting to foil an Automated Turing Test, the Automated Turing Test designers embed the key in the token in ways that make OCR recognition even more difficult, such as, for example, blurring, warping, shading, coloring, or obscuring the text. The drawback to this approach, however, is that attempts to make OCR recognition more difficult have also made text recognition by a human more difficult as well. As such, readers will appreciate that room for improvement exists in the use of Automated Turing Tests.

SUMMARY OF THE INVENTION

Methods, apparatus, and products are disclosed for user authorization using an Automated Turing Test that include: selecting, by an automated Turing Test module, a challenge token, the challenge token including a challenge key; repeatedly at an Automated Turing Test pace: selecting, by the Automated Turing Test module, a portion of the challenge token in dependence upon predetermined selection criteria, and revealing, by Automated Turing Test module, only the selected portion of the challenge token to a user; receiving, by the Automated Turing Test module from the user, a user response; determining, by the Automated Turing Test module, whether the user response matches the challenge key; and authorizing, by the Automated Turing Test module, the user to access a resource if the user response matches the challenge key.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
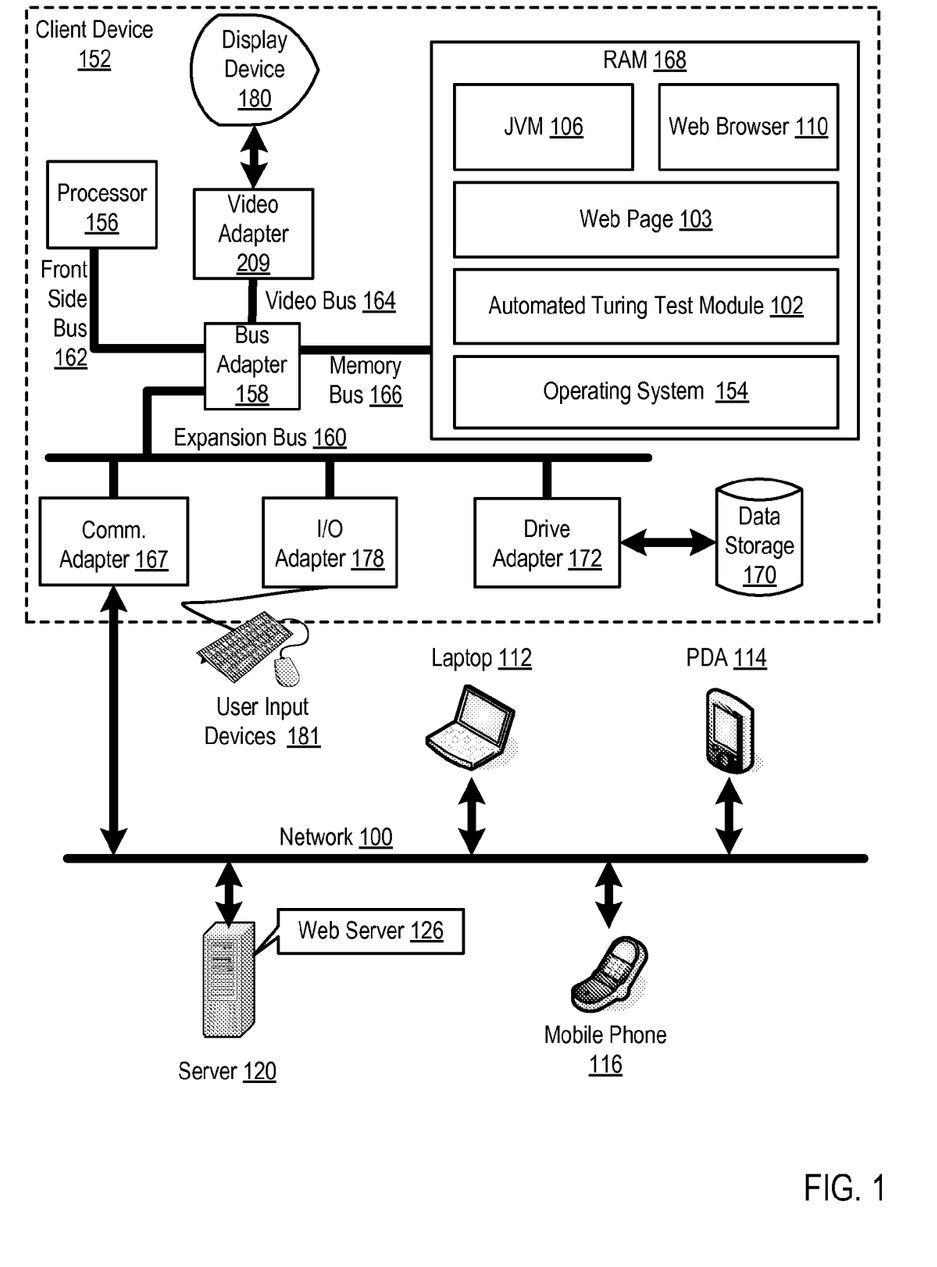
FIG. 1 sets forth a functional block diagram of an exemplary system capable of user authorization using an automated Turing Test according to exemplary embodiments of the present invention.

Exemplary methods, apparatus, and products for user authorization using an automated Turing Test in accordance with the present invention are described with reference to the accompanying drawings, beginning with FIG. 1. FIG. 1 sets forth a functional block diagram of an exemplary system capable of user authorization using an automated Turing Test according to embodiments of the present invention. The exemplary system of FIG. 1 includes several computing devices (152, 112, 114, 116, 120) connected together for data communications through a network (100).

The exemplary client device (152) of FIG. 1 includes a web browser (110) stored in RAM (168). The web browser (110) of FIG. 1 is a software application that enables a user to display and interact with text, images, videos, music, and other information referenced through a web page (103) retrieved from web server (126) installed on server (120). Examples of web browsers include Microsoft's Internet Explorer®, Mozilla's Firefox®, and Apple's Safari®.

Upon loading the web page (103) of FIG. 1, the web browser (110) of FIG. 1 may instruct the client device (152) to execute an automated Turing Test module (102) to perform user authorization using an automated Turing Test according to embodiments of the present invention. The Automated Turing Test module (102) of FIG. 1 may be implemented as a Java™ applet that the web browser (110) downloads when loading the web page (103). The web browser may execute such an automated Turing Test module implementation using a Java Virtual Machine ('JVM') (106) that provide an execution environment for Java™ programs. In other embodiments, however, the Automated Turing Test module (102) may be implemented in the web page (103) as a script such as, for example, JavaScript or a VBScript. In still other embodiments, the Automated Turing Test module (102) may be implemented as an Adobe Flash executable file.

The exemplary client device (152) of FIG. 1 includes the Automated Turing Test module (102) stored in RAM (168). The Automated Turing Test module (102) is a software component having computer program instructions for user authorization using an automated Turing Test according to embodiments of the present invention. The Automated Turing Test module (102) of FIG. 1 operates generally for user authorization using an automated Turing Test according to embodiments of the present invention by: selecting a challenge token, the challenge token including a challenge key; repeatedly at an Automated Turing Test pace, selecting a portion of the challenge token in dependence upon predetermined selection criteria and revealing only the selected portion of the challenge token to a user; receiving a user response from the user; determining whether the user response matches the challenge key; and authorizing the user to access a resource if the user response matches the challenge key. The Automated Turing Test module (102) of FIG. 1 may also operate generally for user authorization using an automated Turing Test according to embodiments of the present invention by: determining the Automated Turing Test pace in dependence upon a workload for the web server (126) providing the resource to the user in the example of FIG. 1.

Also stored in RAM (168) is an operating system (154). Operating systems useful for user authorization using an automated Turing Test according to embodiments of the present invention include UNIX™, Linux™, Microsoft Vista™, AIX™, IBM's i5/OS™, and others as will occur to those of skill in the art. The operating system (154), Automated Turing Test module (102), the JVM (106), the web page (103), and the web browser (110) in the example of FIG. 1 are shown in RAM (168), but many components of such software typically are stored in non-volatile memory also, such as, for example, on a disk drive (170).

The computing device (152) of FIG. 1 includes disk drive adapter (172) coupled through expansion bus (160) and bus adapter (158) to processor (156) and other components of the computing device (152). Disk drive adapter (172) connects non-volatile data storage to the computing device (152) in the form of disk drive (170). Disk drive adapters useful in computing devices for user authorization using an automated Turing Test according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory ('EEPROM' or 'Flash' memory)(134), RAM drives, and so on, as will occur to those of skill in the art.

The example computing device (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing device (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing device (152) of FIG. 1 includes a communications adapter (167) that couples the computing device for data communications with the other computing devices (112, 114, 116, 120) in the data center through a data communications network (100). Such a data communication network (100) may be implemented with external buses such as a Universal Serial Bus ('USB'), or as an Internet Protocol ('IP') network or an Ethernet™ network, an I²C network, a System Management Bus ('SMBus'), an Intelligent Platform Management Bus ('IPMB'), for example, and in other ways as will occur to those of skill in the art. Communications adapters implement the hardware level of data communications through which one computer sends data communications to another computer, directly or through a data communications network. Examples of communications adapters useful for user authorization using an automated Turing Test according to embodiments of the present invention include modems for wired dial-up communications, Ethernet (IEEE 802.3) adapters for wired data communications network communications and 802.11 adapters for wireless data communications network communications.

Although the explanation above with reference to FIG. 1 describes the Automated Turing Test module (102) being executed on the client device (152), readers will note that executing the Automated Turing Test module (102) on the client device (152) is for explanation only and not for limitation. In fact, the Automated Turing Test module (102) may be executed on other remote devices with respect to the user-operated client device (152). For example, the Automated Turing Test module (102) may be installed on the server (120) and invoked by the web server (126). In such an example, the Automated Turing Test module (102) may repeatedly reveal only a selected portion of the challenge token to a user using an animated GIF.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

For further explanation, FIGS. 2A-H set forth line drawings illustrating an exemplary method of user authorization using an automated Turing Test according to exemplary embodiments of the present invention. FIGS. 2A-H each include a web browser graphical user interface ('GUI') (201) used by a user to interact with a web browser. Each web browser GUI (201) includes a challenge token (202). In the examples of FIGS. 2A-H, the challenge token (202) is implemented as an image with both graphical and textual marks. Each web browser GUI (201) also includes a response field (204) for receiving user input that describes the challenge key included in the challenge token (202). In the example of FIGS. 2A-H, the challenge key is implemented as the text '3AT8R7' in the challenge token (202). Readers will note that although the challenge token (202) and the challenge key of FIGS. 2A-H are implemented using visual elements, readers of skill in the art will appreciate that in other embodiments, a challenge token and a challenge key may be implemented using audio elements.

Figure 2A:
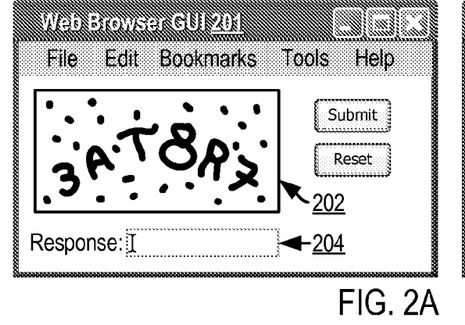
FIGS. 2A-H set forth line drawings illustrating an exemplary method of user authorization using an automated Turing Test according to exemplary embodiments of the present invention.

In the example of FIG. 2A, an automated Turing Test module selects the challenge token (202). The challenge token (202) includes the challenge key '3AT8R7.' The Automated Turing Test module may briefly flash the entire challenge token (202) to the user through the web browser GUI (201) as in FIG. 2A. In other embodiments, however, the Automated Turing Test module may never display the entire challenge token (202) to the user.

In the exemplary FIGS. 2B-G, the Automated Turing Test module repeatedly, at an Automated Turing Test pace, selects a portion of the challenge token (202) in dependence upon predetermined selection criteria and reveals only the selected portion of the challenge token (202) to a user. Depending on the pace at which the Automated Turing Test module repeatedly selects a portion of the challenge token (202) and reveals the selected portion and depending on the portion's shape and size, the user may perceive the illusion of a 'moving spotlight' or 'bouncing ball' over the challenge token (202). The predetermined selection criteria used by the Automated Turing Test module typically specifies a pattern for repeatedly selecting portions of the challenge token (202) to be revealed in such a manner that only portions of the challenge key are revealed to the user at any given moment.

Figure 2B:
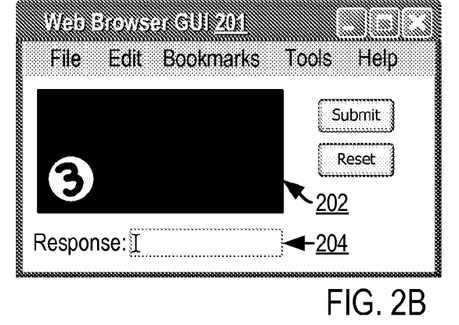
Figure 2C:
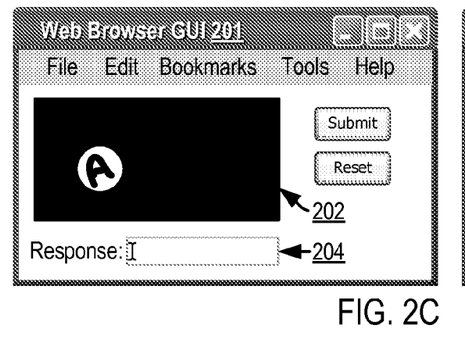
Figure 2D:
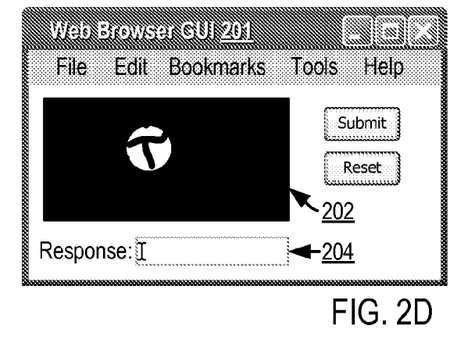
Figure 2E:
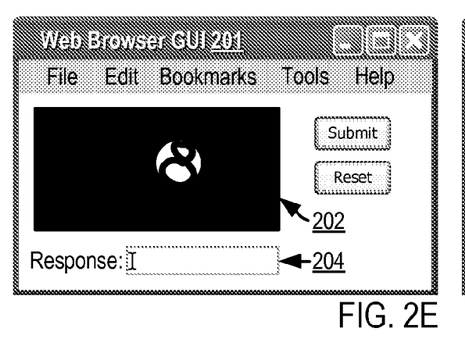
Figure 2F:
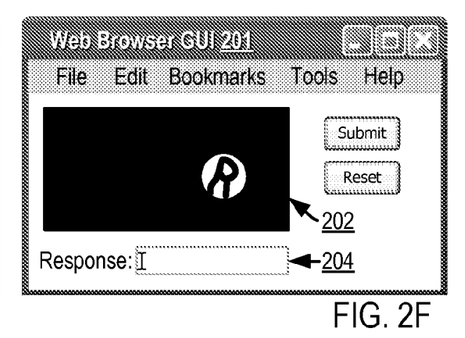
Figure 2G:
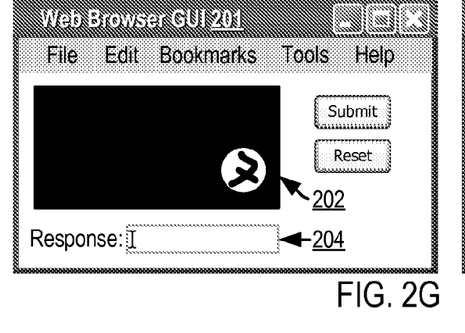

For example, in the exemplary FIG. 2B, the Automated Turing Test module selects a portion of the challenge token (202) that contains the '3' in the challenge key and reveals only the portion of the challenge token that contains the '3' to the user. Based on predefined selection criteria, the Automated Turing Test module of FIG. 2C selects a portion of the challenge token (202) that contains the 'A' in the challenge key and reveals only the portion of the challenge token that contains the 'A' to the user. In the exemplary FIG. 2D, the Automated Turing Test module selects a portion of the challenge token (202) that contains the 'T' in the challenge key and reveals only the portion of the challenge token that contains the 'T' to the user. Based on predefined selection criteria, the Automated Turing Test module of FIG. 2E selects a portion of the challenge token (202) that contains the '8' in the challenge key and reveals only the portion of the challenge token that contains the '8' to the user. In the exemplary FIG. 2F, the Automated Turing Test module selects a portion of the challenge token (202) that contains the 'R' in the challenge key and reveals only the portion of the challenge token that contains the 'R' to the user. Based on predefined selection criteria, the Automated Turing Test module of FIG. 2G selects a portion of the challenge token (202) that contains the '7' in the challenge key and reveals only the portion of the challenge token that contains the '7' to the user.

Figure 2H:
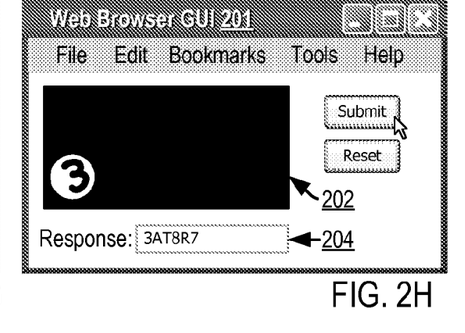

In the example of FIG. 2H, the Automated Turing Test module receives a user response from the user through the response field (204) in the web browser GUI (201). A user typically provides the user response to the Automated Turing Test module after enough iterations of repeatedly selecting a portion of the challenge token (202) and revealing the selected portion to the user have occurred for the user to identify the challenge key. In the example of FIG. 2H, the Automated Turing Test module receives a user response of '3AT8R7' from the user when the user selects the 'Submit' button rendered on the web browser GUI (201). The Automated Turing Test module then determines whether the user response matches the challenge key and authorizes the user to access a resource if the user response matches the challenge key. The resource accessed by the user may be implemented as additional web content, an item emailed or mailed to the user, a service such as web-based email or web-based voting, or any other resource as will occur to those of skill in the art.

Figure 3:
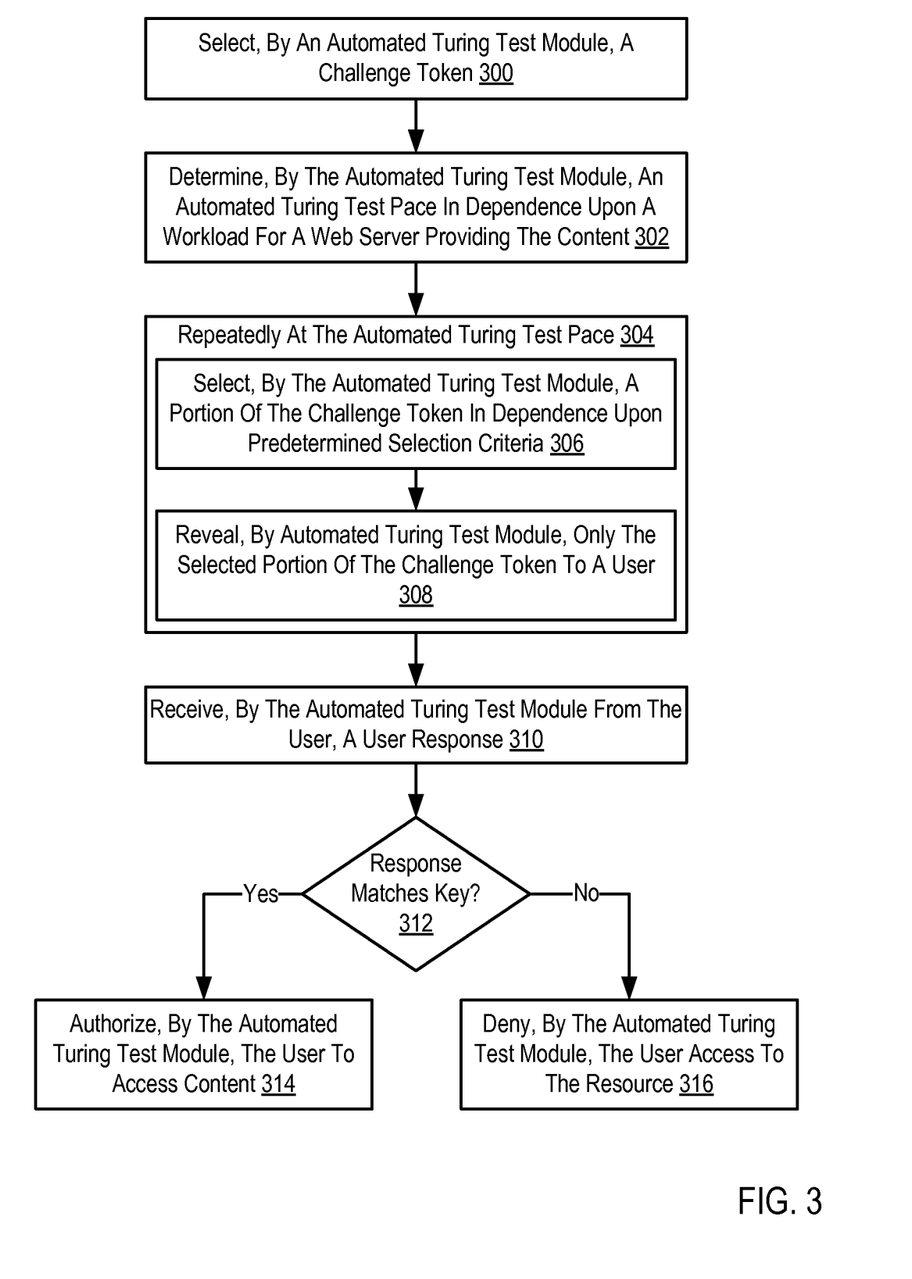
FIG. 3 sets forth a flow chart illustrating a further exemplary method of user authorization using an automated Turing Test according to exemplary embodiments of the present invention.

For further explanation, FIG. 3 sets forth a flow chart illustrating a further exemplary method of user authorization using an automated Turing Test according to exemplary embodiments of the present invention. The method of FIG. 3 includes selecting (300), by an automated Turing Test module, a challenge token. The challenge token includes a challenge key. The Automated Turing Test module may select (300) a challenge token according to the method of FIG. 3 by randomly selecting a challenge token from a token repository.

In other embodiments, the Automated Turing Test module may select (300) a challenge token according to the method of FIG. 3 by selecting a challenge token in dependence upon user attributes. The user attributes specify characteristics that describe the user. Examples of user attributes may include, for example, the user's location, sex, age, preferences, and so on. The Automated Turing Test module may identify the user's user attributes from a user profile for the user or from other information related to the user such as, for example, the IP address for the user's computer. For further explanation, consider, that user attributes for a user specify that the user is French. In such an example, the Automated Turing Test module may select a challenge token that depicts French symbols such as, for example, the Eiffel tower, the French flag, and so on.

The method of FIG. 3 also includes determining (302), by the Automated Turing Test module, the Automated Turing Test pace in dependence upon a workload for a web server providing the user access to resource. The Automated Turing Test module may determine (302) the Automated Turing Test pace in dependence upon a workload for a web server according to the method of FIG. 3 by transmitting a workload status request to the web server and receiving a workload metric from the web server in response. The workload metric may specify the workload for the web server as the size of the web server's workload request queue, the amount of available cache, the rate at which memory swapping is occurring, or any other way of measuring a web server's workload as will occur to those of skill in the art. As the web server's workload increases, the Automated Turing Test module may determine (302) the Automated Turing Test pace according to the method of FIG. 3 by decreasing the pace at which portions of the challenge token are revealed. Decreasing the pace at which portions of the challenge token are revealed increases the amount of time that a user typically requires to identify the challenge key in the challenge token, thereby giving a web server with a high workload time to process the workload before the user is authorized to access any additional web content. Similarly, as the web server's workload decreases, the Automated Turing Test module may determine (302) the Automated Turing Test pace according to the method of FIG. 3 by increasing the pace at which portions of the challenge token are revealed.

The method of FIG. 3 also includes repeatedly (304), at the Automated Turing Test pace, selecting (306), by the Automated Turing Test module, a portion of the challenge token in dependence upon predetermined selection criteria and revealing (308), by Automated Turing Test module, only the selected portion of the challenge token to a user. The Automated Turing Test module may select (306) a portion of the challenge token according to the method of FIG. 3 by identifying a region of the challenge token for display using the predetermined selection criteria. The predetermined selection criteria may be implemented as an algorithm that specifies the region of the challenge token for display based on the current displayed region of the challenge token. In other embodiments, however, the predetermined selection criteria may be implemented as table that specifies a set of regions for the challenge token and the order in which those regions are to be revealed to the user. Regardless of its implementation, however, the predetermined selection criteria may be used to repeatedly select (306) portions of the challenge token to reveal in order to provide the user with an illusion of a moving spotlight, bouncing ball, sliding rectangles, a moving billboard effect, checkerboard patterns, and any other animated patterns as will occur to those of skill in the art.

The Automated Turing Test module may reveal (308) only the selected portion of the challenge token to a user according to the method of FIG. 3 by rendering the selected portion on a GUI available to the user for view and obscuring the remaining portions of the challenge token from the user's view. In embodiments of the present invention that implement a challenge token and a challenge key using audio elements, the Automated Turing Test module may reveal (308) only the selected portion of the challenge token to a user by rendering the selected portions to the user through a speaker.

The method of FIG. 3 includes receiving (310), by the Automated Turing Test module from the user, a user response. The Automated Turing Test module may receive (310) a user response from the user according to the method of FIG. 3 by prompting the user to provide the user response. The Automated Turing Test module may then receive (310) a user response from the user according to the method of FIG. 3 by receiving text from the user through a GUI. In other embodiments, the Automated Turing Test module may receive (310) a user response from the user according to the method of FIG. 3 by receiving speech utterances from the user and converting those speech utterances to speech text.

The method of FIG. 3 also includes determining (312), by the Automated Turing Test module, whether the user response matches the challenge key. The manner in which the Automated Turing Test module may determines (312) whether the user response matches the challenge key according to the method of FIG. 3 may vary depending on the implementation of the challenge key. For example, when the challenge key is implemented as text embedded within an image, the Automated Turing Test module may determine (312) whether the user response matches the challenge key according to the method of FIG. 3 by comparing the text of the user response with the text of the challenge key. If the text of the user response and the text of the challenge key are the same, then the user response matches the challenge key. The user response does not match the challenge key, however, if the text of the user response and the text of the challenge key are not the same. In other embodiments, the challenge key may be implemented as image embedded within an image implementing the challenge token. For example, the challenge token may be implemented as an image including a various images of animals, and the challenge key may be implemented as an image of a horse within the challenge token. In such embodiments, the Automated Turing Test module may determine (312) whether the user response matches the challenge key according to the method of FIG. 3 by comparing the text of the user response with metadata text describing the image implementing the challenge key.

The method of FIG. 3 includes authorizing (314), by the Automated Turing Test module, the user to access a resource if the user response matches the challenge key and denying (316), by the Automated Turing Test module, the user access to the resource if the user response does not match the challenge key. As mentioned above, the resource may be implemented as additional web content, an item emailed or mailed to the user, a service such as web-based email or web-based voting, or any other resource as will occur to those of skill in the art.

Figure 4:
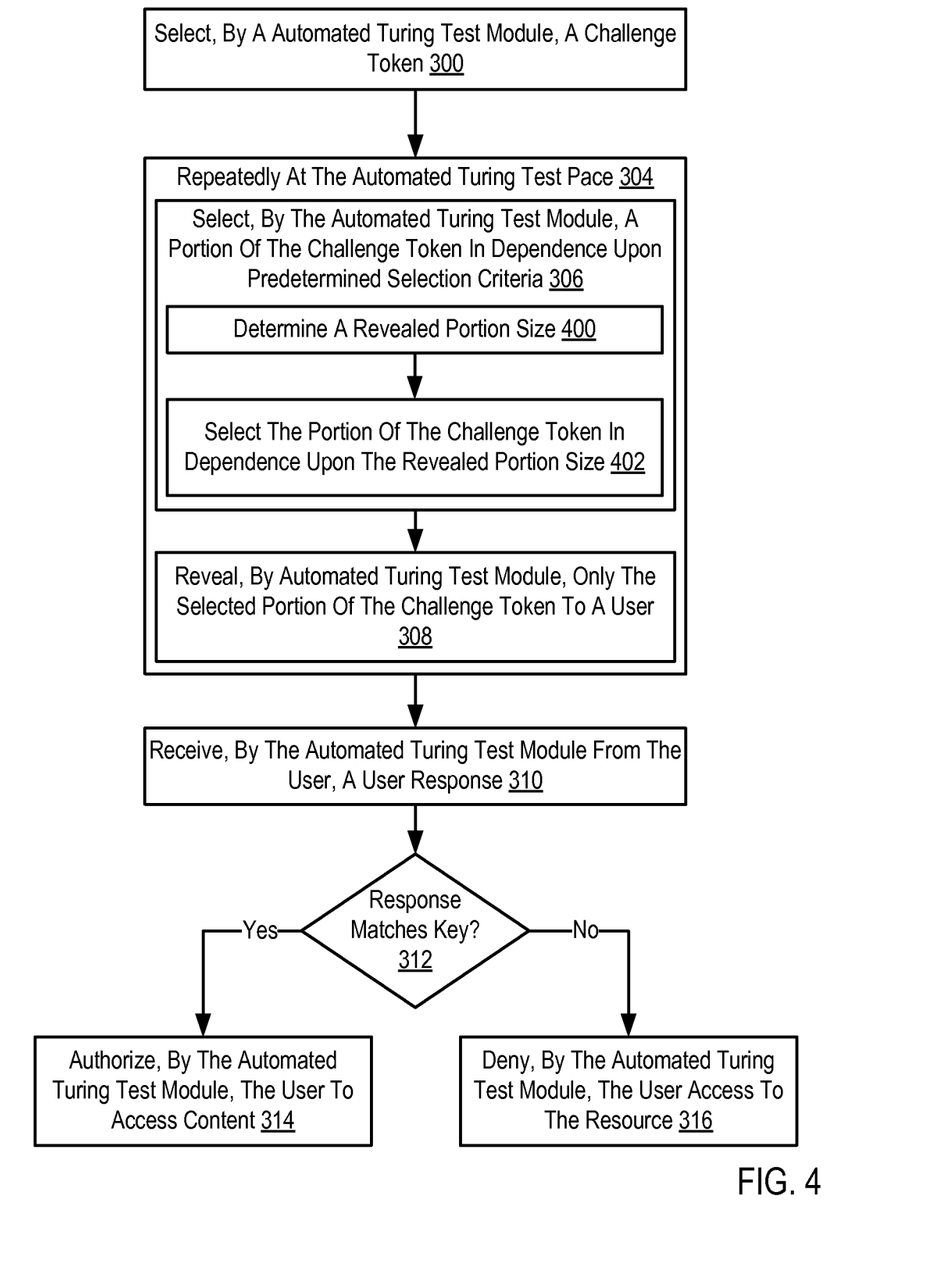
FIG. 4 sets forth a flow chart illustrating a further exemplary method of user authorization using an automated Turing Test according to exemplary embodiments of the present invention.

The size for the portion of the challenge token that is revealed to the user may vary depending on a number of factors. For further explanation, therefore, consider, FIG. 4 that sets forth a flow chart illustrating a further exemplary method of user authorization using an automated Turing Test according to exemplary embodiments of the present invention. The method of FIG. 4 is similar to the method of FIG. 3. That is, the method of FIG. 4 includes: selecting (300), by an automated Turing Test module, a challenge token, the challenge token including a challenge key; repeatedly (304) at an Automated Turing Test pace: selecting (306), by the Automated Turing Test module, a portion of the challenge token in dependence upon predetermined selection criteria, and revealing (308), by Automated Turing Test module, only the selected portion of the challenge token to a user; receiving (310), by the Automated Turing Test module from the user, a user response; determining (312), by the Automated Turing Test module, whether the user response matches the challenge key; authorizing (314), by the Automated Turing Test module, the user to access a resource if the user response matches the challenge key; and denying (316), by the Automated Turing Test module, the user access to the resource if the user response does not match the challenge key.

The method of FIG. 4 differs from the method of FIG. 3 in that selecting (306), by the Automated Turing Test module, a portion of the challenge token in dependence upon predetermined selection criteria according to the method of FIG. 4 includes determining (400) a revealed portion size and selecting (402) the portion of the challenge token in dependence upon the revealed portion size. The revealed portion size is the size of the portion of the challenge token revealed to the user during each iteration described above. The Automated Turing Test module may determine (400) the revealed portion size according to the method of FIG. 4 by retrieving a predefined portion size based on the shape of the portion to be revealed, that is, whether the shape is a circle, square, rectangle, and so on. The Automated Turing Test module may also determine (400) the revealed portion size according to the method of FIG. 4 based on the relationship between the size of the challenge token and the size of the challenge key. Still further, the Automated Turing Test module may also determine (400) the revealed portion size according to the method of FIG. 4 by randomly selecting a revealed portion size. The Automated Turing Test module may also determine (400) the revealed portion size according to the method of FIG. 4 in dependence upon the predetermined selection criteria used to select the particular portion of the challenge token to reveal during each iteration.

Figure 5:
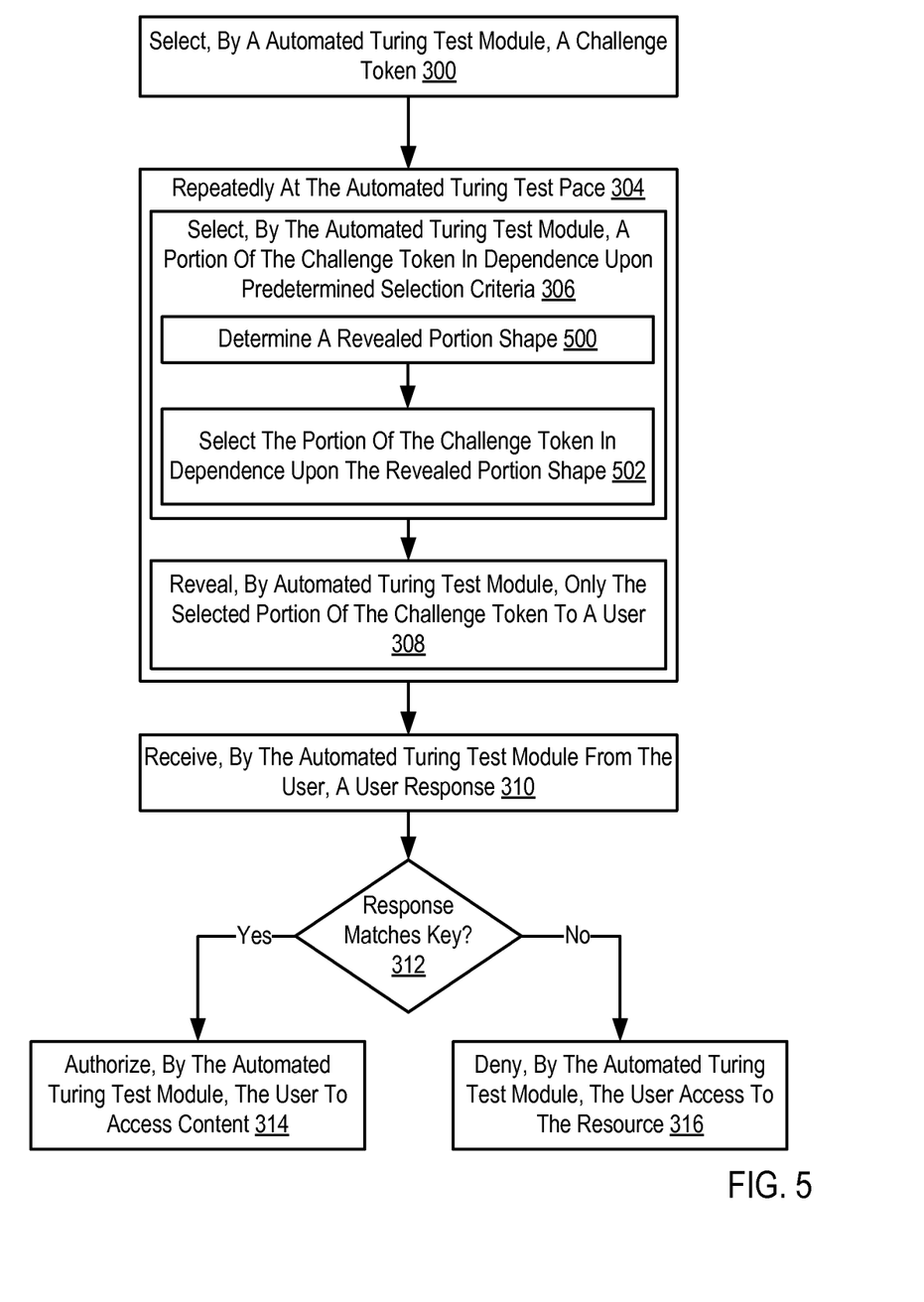
FIG. 5 sets forth a flow chart illustrating a further exemplary method of user authorization using an automated Turing Test according to exemplary embodiments of the present invention.

The shape for the portion of the challenge token that is revealed to the user may vary depending on a number of factors. For further explanation, therefore, consider, FIG. 5 that sets forth a flow chart illustrating a further exemplary method of user authorization using an automated Turing Test according to exemplary embodiments of the present invention. The method of FIG. 5 is similar to the method of FIG. 3. That is, the method of FIG. 5 includes: selecting (300), by an automated Turing Test module, a challenge token, the challenge token including a challenge key; repeatedly (304) at an Automated Turing Test pace: selecting (306), by the Automated Turing Test module, a portion of the challenge token in dependence upon predetermined selection criteria, and revealing (308), by Automated Turing Test module, only the selected portion of the challenge token to a user; receiving (310), by the Automated Turing Test module from the user, a user response; determining (312), by the Automated Turing Test module, whether the user response matches the challenge key; authorizing (314), by the Automated Turing Test module, the user to access a resource if the user response matches the challenge key; and denying (316), by the Automated Turing Test module, the user access to the resource if the user response does not match the challenge key.

The method of FIG. 5 differs from the method of FIG. 3 in that selecting (306), by the Automated Turing Test module, a portion of the challenge token in dependence upon predetermined selection criteria according to the method of FIG. 5 includes determining (500) a revealed portion shape and selecting (502) the portion of the challenge token in dependence upon the revealed portion shape. The revealed portion shape is the shape of the portion of the challenge token revealed to the user during each iteration described above. The Automated Turing Test module may determine (500) a revealed portion shape according to the method of FIG. 5 by selecting a predefined shape such as, for example, a circle, square, rectangle, and so on. The Automated Turing Test module may determine (500) a revealed portion shape according to the method of FIG. 5 based on the relationship between the size of the challenge token and the size of the challenge key. Still further, the Automated Turing Test module may determine (500) a revealed portion shape according to the method of FIG. 5 by randomly selecting the revealed portion shape. The Automated Turing Test module may determine (500) a revealed portion shape according to the method of FIG. 5 in dependence upon the predetermined selection criteria used to select the particular portion of the challenge token to reveal during each iteration.

The exemplary challenge tokens discussed above are generally described as including only a single challenge key. Readers will note, however, that challenge tokens useful in user authorization using an automated Turing Test according to exemplary embodiments of the present invention may include any number of challenge keys. For further explanation, consider FIGS. 6A-H that set forth line drawings illustrating a further exemplary method of user authorization using an automated Turing Test according to exemplary embodiments of the present invention.

FIGS. 6A-H each include a web browser graphical user interface ('GUI') (201) used by a user to interact with a web browser. Each web browser GUI (201) includes a challenge token (202). In the examples of FIGS. 6A-H, the challenge token (202) is implemented as an image with textual elements. Each web browser GUI (201) also includes a response field (204) for receiving user input that describes the challenge key. The challenge token (202) of FIGS. 6A-H includes a plurality of challenge keys. In the example of FIGS. 6A-H, the challenge keys are implemented as combinations of the letters in the challenge token (202) such as, for example, the text '3AT8R7,' '3AT8P2,' 'S4T8R7,' 'S4A9MR7,' and so on.

Figure 6A:
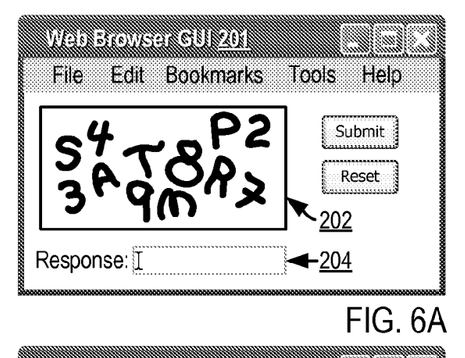
FIGS. 6A-H set forth line drawings illustrating a further exemplary method of user authorization using an automated Turing Test according to exemplary embodiments of the present invention.

In the example of FIG. 6A, an automated Turing Test module selects the challenge token (202). The Automated Turing Test module may briefly flash the entire challenge token (202) to the user through the web browser GUI (201) as in FIG. 6A. In other embodiments, however, the Automated Turing Test module may never display the entire challenge token (202) to the user.

In the exemplary FIGS. 6B-G, the Automated Turing Test module repeatedly, at an Automated Turing Test pace, selects a portion of the challenge token (202) in dependence upon predetermined selection criteria and reveals only the selected portion of the challenge token (202) to a user. In the example of FIGS. 6A-H, the predetermined selection criteria specify the challenge key to reveal among the plurality of challenge keys. The predetermined selection criteria specify the challenge key to reveal among the plurality of challenge keys by specifying the portions of the challenge token (202) repeatedly selected and revealed to the user. For example, if the predetermined selection criteria specify repeatedly selecting and revealing the letters 'S,' 'A,' '9,' 'M,' 'R,' and '7,' the predetermined selection criteria specify the challenge key 'SA9MR7' among the plurality of other challenge keys in the challenge token (202).

Figure 6B:
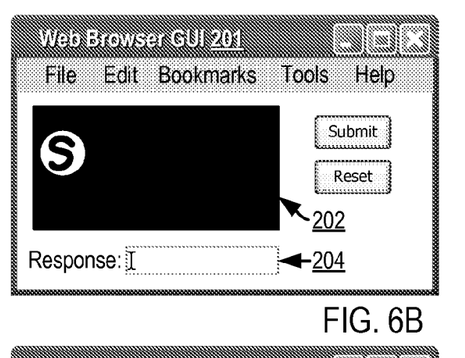
Figure 6C:
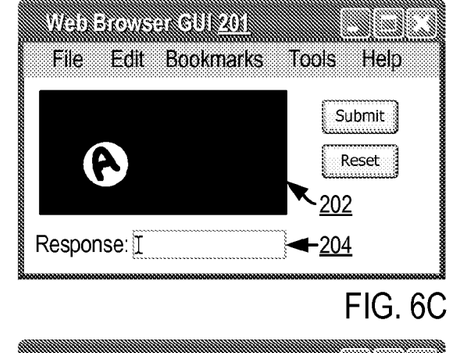
Figure 6D:
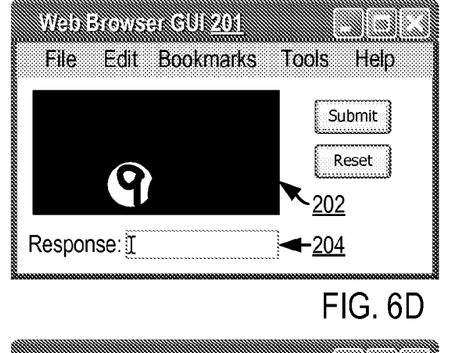
Figure 6E:
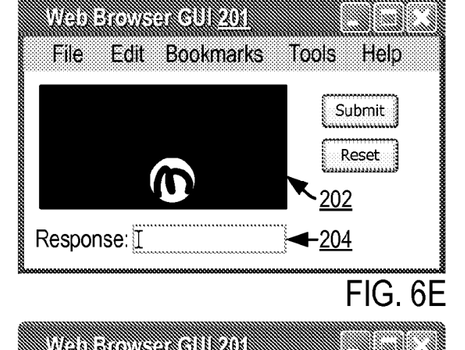
Figure 6F:
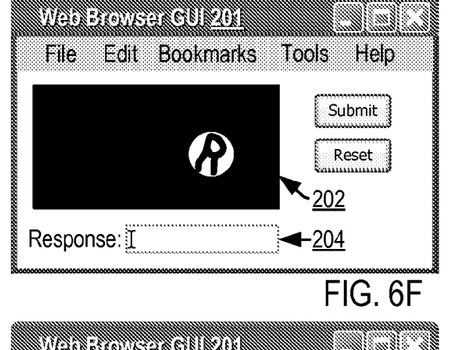
Figure 6G:
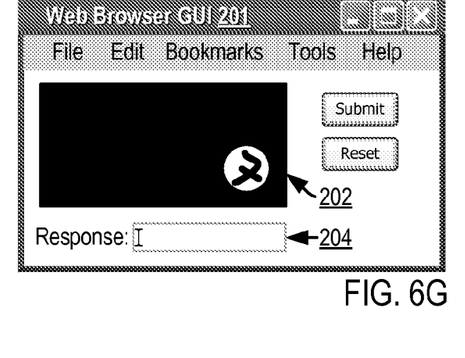

For further example, in the exemplary FIG. 6B, the Automated Turing Test module selects a portion of the challenge token (202) that contains the 'S' in the challenge key and reveals only the portion of the challenge token that contains the 'S' to the user. Based on predefined selection criteria, the Automated Turing Test module of FIG. 6C selects a portion of the challenge token (202) that contains the 'A' in the challenge key and reveals only the portion of the challenge token that contains the 'A' to the user. In the exemplary FIG. 6D, the Automated Turing Test module selects a portion of the challenge token (202) that contains the '9' in the challenge key and reveals only the portion of the challenge token that contains the '9' to the user. Based on predefined selection criteria, the Automated Turing Test module of FIG. 6E selects a portion of the challenge token (202) that contains the 'M' in the challenge key and reveals only the portion of the challenge token that contains the 'M' to the user. In the exemplary FIG. 6F, the Automated Turing Test module selects a portion of the challenge token (202) that contains the 'R' in the challenge key and reveals only the portion of the challenge token that contains the 'R' to the user. Based on predefined selection criteria, the Automated Turing Test module of FIG. 6G selects a portion of the challenge token (202) that contains the '7' in the challenge key and reveals only the portion of the challenge token that contains the '7' to the user.

Figure 6H:
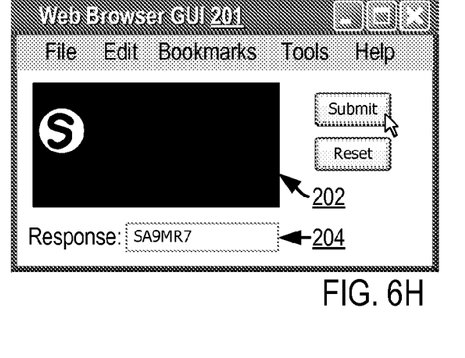

In the example of FIG. 6H, the Automated Turing Test module receives a user response from the user through the response field (204) in the web browser GUI (201). A user typically provides the user response to the Automated Turing Test module after enough iterations of repeatedly selecting a portion of the challenge token (202) based on the predefined selection criteria and revealing the selected portion to the user have occurred for the user to identify the challenge key. As mentioned above, based on the predefined selection criteria, the Automated Turing Test module repeatedly selects portion of the challenge token (202) containing the letters 'S,' 'A,' '9,' 'M,' 'R,' and '7,' and reveals those selected portions to the user. In response, the Automated Turing Test module receives a user response of 'SA9MR7' from the user when the user selects the 'Submit' button rendered on the web browser GUI (201) in the example of FIG. 6H. The Automated Turing Test module then determines whether the user response matches the challenge key specified by the predetermined selection criteria and authorizes the user to access a resource if the user response matches the challenge key.

Exemplary embodiments of the present invention are described largely in the context of a fully functional computer system for user authorization using an automated Turing Test. Readers of skill in the art will recognize, however, that the present invention also may be embodied in a computer program product disposed on a computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of user authorization using a Completely Automated Public Turing Test to distinguish Computers from Humans ('Automated Turing Test'), the method comprising:
   receiving, by a client device over a network, a request for a resource available on a remote web server;
   transmitting, by the client device over the network, a workload status request to the web server;
   receiving, by the client device over the network, an indication of a workload of the web server;
   determining, by an Automated Turing Test module executing on the client device, an Automated Turing Test pace based upon the workload of the web server, wherein the Automated Turing Test pace affects a time duration for revealing a challenge token, wherein the Automated Turing Test pace decreases as the workload increases;
   selecting, by the Automated Turing Test module, the challenge token, the challenge token including a challenge key;
   repeatedly performing the following operations at the Automated Turing Test pace:
      selecting, by the Automated Turing Test module, a portion of the challenge token; and
      presenting, by the Automated Turing Test module on a display device of the client device, the portion of the challenge token to a user;
      receiving, by the Automated Turing Test module from the user, a user response;
      determining, by the Automated Turing Test module, whether the user response matches the challenge key; and
      authorizing, by the Automated Turing Test module, the user to access a resource if the user response matches the challenge key.

2. The method of claim 1 wherein selecting, by the Automated Turing Test module, a portion of the challenge token further comprises:
   determining a size; and
   selecting the portion of the challenge token in dependence upon the size.

3. The method of claim 1 wherein selecting, by the Automated Turing Test module, a portion of the challenge token further comprises:
   determining a revealed portion shape; and
   selecting the portion of the challenge token in dependence upon the revealed portion shape.

4. The method of claim 1 wherein:
   the challenge token includes a plurality of challenge keys and wherein the selecting the challenge token is based on predetermined selection criteria;
   the predetermined selection criteria specify the challenge key among the plurality of challenge keys; and
   determining, by the Automated Turing Test module, whether the user response matches the challenge key further comprises determining whether the user response matches the challenge key in dependence upon the predetermined selection criteria.

5. The method of claim 1 wherein selecting, by the Automated Turing Test module, the challenge token further comprises selecting, by the Automated Turing Test module, the challenge token in dependence upon user attributes.

6. An apparatus for user authorization using a Completely Automated Public Turing test to tell Computers and Humans Apart ('Automated Turing Test'), the apparatus comprising:
   a display device;
   a processor;
   a memory device operatively coupled to the processor, the memory device including computer program instructions, that when executed on the processor, cause the apparatus to:
   receive a request for a resource available on a remote web server;
   transmit, over a network, a workload status request to the web server;
   receive, over the network, an indication of a workload of the web server;
   determine, by an Automated Turing Test module, an Automated Turing Test pace based upon the workload of the web server, wherein the Automated Turing Test pace affects a time duration for revealing a challenge token, wherein the Automated Turing Test pace decreases as the workload increases;
   select, by the Automated Turing Test module, the challenge token, the challenge token including a challenge key;
   at the Automated Turing Test pace:
      select, by the Automated Turing Test module, a portion of the challenge token; and
      reveal, on the display device, the portion of the challenge token to a user;
      receive, by the Automated Turing Test module from the user, a user response;
      determine, by the Automated Turing Test module, whether the user response matches the challenge key; and
      authorize, by the Automated Turing Test module, the user to access a resource if the user response matches the challenge key.

7. The apparatus of claim 6 wherein selecting, by the Automated Turing Test module, a portion of the challenge token further comprises operations to:
   determine a revealed portion size; and
   select the portion of the challenge token in dependence upon the revealed portion size.

8. The apparatus of claim 6 wherein selecting, by the Automated Turing Test module, a portion of the challenge token further comprises operations to:
   determine a revealed portion shape; and
   select the portion of the challenge token in dependence upon the revealed portion shape.

9. The apparatus of claim 6 wherein:
   the challenge token includes a plurality of challenge keys, and wherein the selection of the challenge token is based on predetermined selection criteria;

the predetermined selection criteria to specify the challenge key among the plurality of challenge keys; and determine, by the Automated Turing Test module, whether the user response matches the challenge key further comprises a determination whether the user response matches the challenge key in dependence upon the predetermined selection criteria.

10. The apparatus of claim 6 wherein selecting, by the Automated Turing Test module, the challenge token further comprises operations to: select, by the Automated Turing Test module, the challenge token in dependence upon user attributes.

11. A computer program product for user authorization using a Completely Automated Public Turing test to tell Computers and Humans Apart ('Automated Turing Test'), the computer program product disposed in a non-transitory computer readable memory device, the computer program product comprising computer program instructions capable of:

receiving, by a client device over a network, a request for a resource available on a remote web server;

transmitting, by the client device over the network, a workload status request to the web server;

receiving, by the client device over the network, an indication of a workload of the web server;

determining, by an Automated Turing Test module, an Automated Turing Test pace based on the workload of the web server, wherein the Automated Turing Test pace affects a time duration for revealing a challenge token, wherein the Automated Turing Test pace decreases as the workload increases;

selecting, by the Automated Turing Test module, a challenge token, the challenge token including a challenge key;

repeatedly at the Automated Turing Test pace:

selecting, by the Automated Turing Test module, a portion of the challenge token; and revealing, by the Automated Turing Test module on a display device, only the portion of the challenge token to a user;

receiving, by the Automated Turing Test module from the user, a user response;

determining, by the Automated Turing Test module, whether the user response matches the challenge key; and authorizing, by the Automated Turing Test module, the user to access a resource if the user response matches the challenge key.

12. The computer program product of claim 11 wherein selecting, by the Automated Turing Test module, a portion of the challenge token is based on predetermined selection criteria, the selecting further comprises:

determining a revealed portion size; and selecting the portion of the challenge token in dependence upon the revealed portion size.

13. The computer program product of claim 12 wherein:

the challenge token includes a plurality of challenge keys;

the predetermined selection criteria specify the challenge key among the plurality of challenge keys; and determining, by the Automated Turing Test module, whether the user response matches the challenge key further comprises determining whether the user response matches the challenge key in dependence upon the predetermined selection criteria.

14. The computer program product of claim 11 wherein selecting, by the Automated Turing Test module, a portion of the challenge token further comprises:

determining a revealed portion shape; and selecting the portion of the challenge token in dependence upon the revealed portion shape.

15. The computer program product of claim 11 wherein selecting, by the Automated Turing Test module, the challenge token further comprises selecting, by the Automated Turing Test module, the challenge token in dependence upon user attributes.

* * * * *